United States Patent [19]

Leveque

[11] Patent Number: 4,868,861
[45] Date of Patent: Sep. 19, 1989

[54] TRUNK DIALING CONVERTER
[75] Inventor: James H. Leveque, Ellicott City, Md.
[73] Assignee: AMAF Industries, Inc., Columbia, Md.
[21] Appl. No.: 187,442
[22] Filed: Apr. 28, 1988
[51] Int. Cl.$^4$ .................. H04R 29/00; H03D 3/00
[52] U.S. Cl. .................................. 379/58; 375/80; 375/88; 375/99; 379/235; 379/281; 379/237
[58] Field of Search .................. 379/58, 229, 235–237, 379/239–240, 280–281, 286–287; 375/80, 88, 99

[56] References Cited

U.S. PATENT DOCUMENTS

| | | | |
|---|---|---|---|
| 3,261,923 | 7/1966 | Anderson et al. | 379/235 |
| 3,349,191 | 10/1967 | Mann | 379/235 |
| 3,790,719 | 2/1974 | Montague et al. | 379/235 |
| 4,215,246 | 7/1980 | Sawyer | 379/280 |

Primary Examiner—Jin F. Ng
Assistant Examiner—David H. Kim
Attorney, Agent, or Firm—Birch, Stewart, Kolasch & Birch

[57] ABSTRACT

A digital FSK trunk dialing converter including M and E lead control is disclosed. The dialing converter further includes an FSK detector which is responsive to consecutive half period intervals of a received FSK signal, and a digital signal-to-noise (S/N) detector or estimator which operates to inhibit or keep the E-wire signal lead deactivated in the presence of noise signals which are received from the communications link in absence of acceptable FSK signals. The FSK detector is comprised of two digital circuits which generate pulses indicative of whether the received FSK signal is greater or less than the FSK center frequency. The pulses are integrated and used to trigger a flip-flop which provides a demodulated digital FSK output indicative of a received high or low FSK analog frequency. An E-wire control signal is generated in the receive logic circuitry in response to the demodulated FSK output. The S/N detector comprises a digital circuit coupled to the FSK detector and is responsive to the pulses generated thereby to generate reset signals which are coupled to logic circuitry when noise signals are received to prevent the generation of an E-wire signal when noise is present.

15 Claims, 6 Drawing Sheets

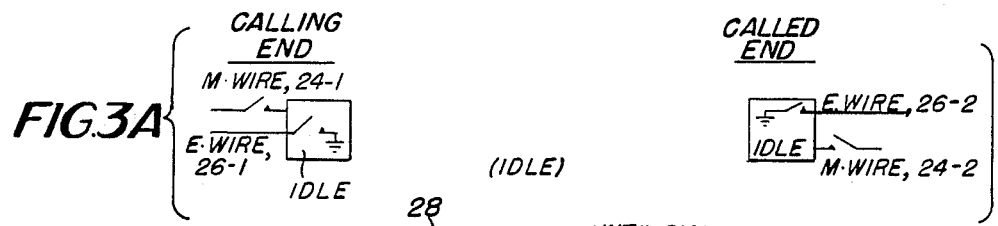
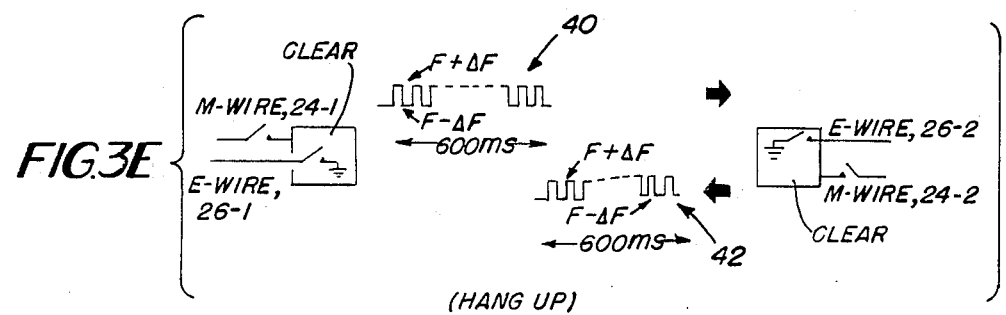

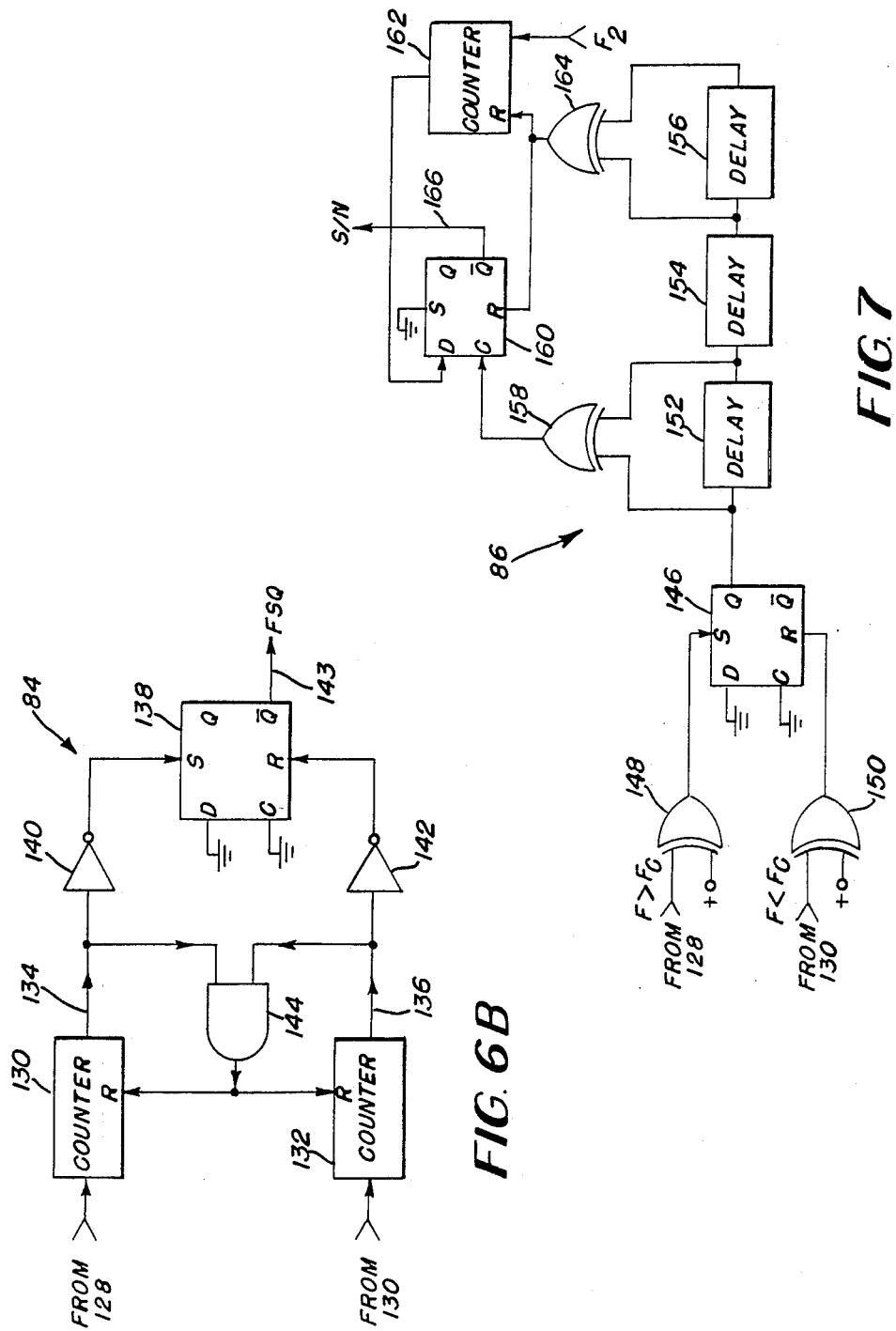

TRUNK DIALING CONVERTER

BACKGROUND OF THE INVENTION

This invention relates generally to telephone communications apparatus and more particularly to a frequency shift keyed (FSK) trunk dialing converter for controlling two-way communications between telephone systems utilizing standard E and M lead control.

Trunk dialing converters for connecting a local telephone set to a remote telephone set over a high frequency radio link, for example, are generally known. In such applications, a trunk dialing converter is located on each side of the link to couple the telephone sets through the respective telephone systems which could include PBX apparatus. Each trunk dialing converter includes circuit means for generating FSK seizing, dialing, answering, and clearing signals which are transmitted as voice frequency tones frequency modulated about a center frequency. Also included in each converter are a pair of separate voice path circuits, one for transmitting to and one for receiving voice communications from the link which may include, for example, a "Lincompex" system. The voice paths, however, are interrupted during FSK control signal transmission and reception.

Typical examples of known prior art trunk systems are disclosed in the following patents: U.S. Pat. No. 3,261,923, entitled, "Frequency-Shift Dial Pulsing System", which issued to L. T. Anderson, et al. on July 19, 1966; U.S. Pat. No. 3,349,191, entitled, "Talk-off Protection for In-band Telephone signaling Systems, which issued to H. Mann on Oct. 24, 1967; and U.S. Pat. No. 3,790,719, entitled, "Method and Means for Connecting Branch Exchanges", which issued to B. R. Montague, et al. on Feb. 5, 1974.

Accordingly, it is an object of the present invention to provide an improvement in telephone communication apparatus.

It is a further object of the invention to provide an improvement in trunk dialing apparatus.

It is yet another further object of the invention to provide an improvement in digital trunk dialing apparatus.

And it is still a further object of the invention to provide an improvement in digital frequency shift keyed (FSK) trunk dialing apparatus.

SUMMARY

Briefly, the foregoing and other objects of the invention are provided in digital trunk dialing converter apparatus including M and E lead control which converts DC signals on the M-wire or lead into voice frequency FM signals on the transmit path. These signals are then fed to a communications link in the same fashion as normal speech. The FM signals at the receiving end are then converted back into DC signals on the E-wire of a second identical trunk dialing converter. Both dialing converters also include a separate voice transmit and receive communications path, each having isolation switches which are respectively opened during seizing, dialing, answering and clearing control intervals. The present invention is directed to improved digital logic circuitry in the receive portion of the apparatus, a unique FSK detector which is responsive to consecutive half period intervals of a received FSK signal, and a digital signal-to-noise (S/N) detector or estimator which operates to inhibit or keep the E-wire signal lead deactivated in the presence of noise signals which are received from the communications link in absence of acceptable FSK signals. The FSK detector is comprised of two digital circuits which generate pulses indicative of whether the received FSK signal is greater or less than the FSK center frequency. The pulses are integrated and used to trigger a flip-flop which provides a demodulated digital FSK output indicative of a received high or low FSK analog frequency. An E-wire control signal is generated in the receive logic circuitry in response to the demodulated FSK output. The S/N detector comprises a digital circuit coupled to the FSK detector and responsive to the pulses generated thereby to generate reset signals which are coupled to the logic circuitry when noise signals are received to prevent the generation of an E-wire signal when noise is present.

BRIEF DESCRIPTION OF THE DRAWINGS

The invention can best be understood when taken in conjunction with the accompanying drawings wherein:

FIGS. 3A through 3E are a set of diagrams illustrative of the operating sequence of a trunk dialing converter in accordance with this invention;

FIGS. 6A and 6B comprise a simplified electrical schematic diagram illustrative of the digital FSK detector included in the demodulator section of the circuitry of the trunk dialing converter shown in FIG. 5;

FIG. 7 is a simplified electrical schematic diagram illustrative of the signal-to-noise detector included in the demodulator section shown in FIG. 5.

DETAILED DESCRIPTION

Figure 1:
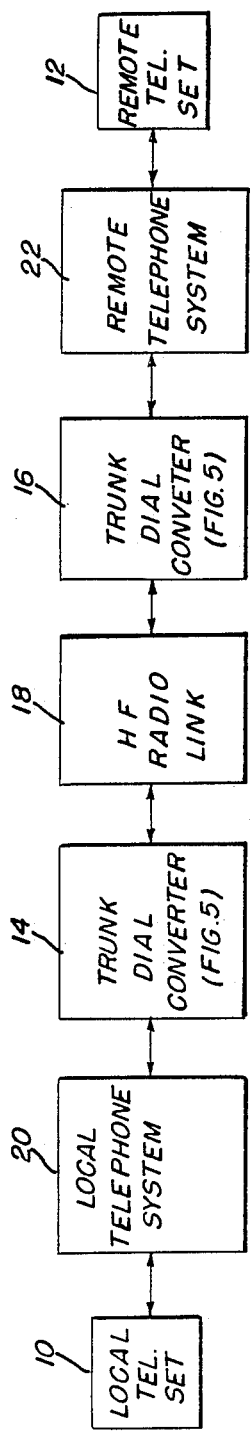
FIG. 1 is a block diagram illustrative of a telephone system which utilizes the subject invention.

Referring now to the drawings and more particularly to FIG. 1, shown thereat is a block diagram of a conventional radio-telephone system whereby a local telephone set 10 can communicate with a remote telephone set 12 via a pair of identical trunk dialing converters 14 and 16, including the subject matter of the subject invention, which are located on either side of a wireless communications link. The link may be, for example, a high frequency full loop duplex radio link such as a digital "Lincompex" system, the latter comprising apparatus well known to those skilled in the art and disclosed, for example, in U.S. Pat. No. 4,271,499, J. Howard Leveque, the present inventor. Located between the telephone sets 10 and 12 and the respective trunk dialing converters 14 and 16 are conventional telephone systems 20 and 22 which may, when desirable, include private branch exchange (PBX) equipment.

The trunk dialing converters 14 and 16 are identical in construction and comprise frequency shift keyed (FSK) units for providing two-way telephone communications over the high frequency radio link 18 utilizing conventional E and M wire or lead control. Such control techniques are also well known to those skilled in the art.

Figure 2:
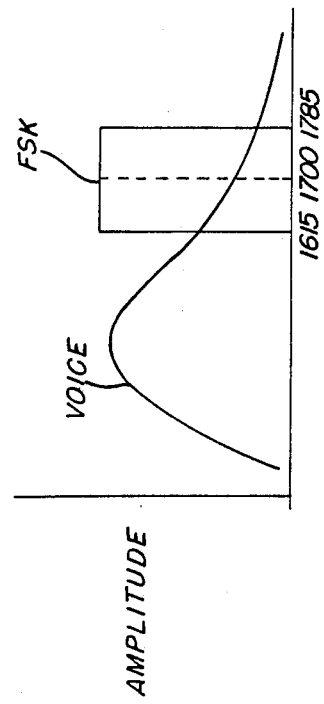
FIG. 2 is a characteristic curve helpful in understanding the operation of the subject invention.

Briefly, each of the trunk dialing converters 14 and 16 convert DC signals on their respective M-wire input leads into voice frequency FM signals which are coupled to the link 18 and are fed thereto in the same fashion as normal speech. The FM signals at the receiving end of the link are converted back into DC signals on their respective E-wire leads. The FM signals utilized comprise two frequency shift keyed signals $f \pm \Delta f$ where $f = 1700$ Hz and $\Delta f = 85$ Hz. As shown in FIG. 2, the center frequency of 1700 Hz is located in the upper band of the voice spectrum with $f - \Delta f = 1615$ Hz while $f + \Delta f = 1785$ Hz.

The typical operating sequence for the apparatus including this invention is illustrated in FIGS. 3A–3E. Considering these figures, in the "idle" state (FIG. 3A), the M-wire and E-wire circuits 24-1, 24-2 and 26-1, 26-2 at both the calling end and called end are shown being open circuited.

When a calling subscriber lifts his handset from the cradle, not shown, an "off-hook" condition exists whereupon the caller hears the dial tone from the telephone exchange 20 at the calling end. Next, and as shown in FIG. 3B, the local exchange 20 causes the M-wire circuit 24-1 to change state, which is illustrated as a closure of a switch. A "seize" pulse train 28 consisting of consecutive $f + \Delta f$ and $f - \Delta f$ FSK analog signals, i.e. tones modulated at 100 baud are generated and transmitted from trunk dialing converter 14 over the high frequency radio link 18 to the other dialing converter 16 for a period of 300 milliseconds (msec) followed by a continuous tone of $f + \Delta f$ for another 300 msec, the beginning of the generation of "dialing" signals. A transmit voice path in the local trunk dialing converter 14 is "split" or opened during this interval.

The trunk dialing converter 16 on the other side of the radio link 18 responds to the FSK received from dialing converter 14 by closing the E-wire circuit 24-2 as shown by the closed switch condition at the called end. With the E-wire circuit 24-2 changing state, a dial tone 30 is generated and sent back to the calling end converter 14. The dial tone is received from the remote telephone system 22 whereupon the calling end converter 14 dials the number of the remote telephone set 12.

This is represented by FIG. 3C wherein the M-wire 24-1 changes state in sympathy with the dial pulses 32 wherein a make (mark) and break (space) condition of the M wire switch is represented by $f + \Delta f = 1785$ Hz and $f - \Delta f = 1615$ Hz having intervals of 33 ms and 66 ms, respectively. The dial pulses are received at the called end converter 16 whereupon the E-wire circuit 24-2 responds in like fashion. The remote telephone system 22 recognizes the number and accesses the subscriber of the remote telephone set 12. During this interval, the voice path circuit in the called end trunk dial converter 16 is also open. A ring tone 34 is then sent back to the calling end over the high frequency radio link 18.

As shown in FIG. 3D, the M-wire circuit 26-2 at the remote end dialing converter 16 also changes state, causing a seize pulse train 36 of $f + \Delta f$ and $f - \Delta f$ to be sent back to the calling end converter 14 which causes its E-wire circuit 26-1 to change state. Both the voice paths at either end are open circuited during the duration of this pulse signalling; however, with both E-wire circuits 26-1 and 26-2 having changed state along with the respective M-wire circuits 24-1 and 24-2, both transmit and receive voice paths are closed permitting a conversation to take place bidirectionally across the link 18 as evidenced by reference numerals 36 and 38.

When the voice communication has ended, the calling party hangs up his telephone set 10 by again placing his handset on the cradle, whereupon an "on hook" condition occurs. This causes the M-wire circuit 24-1 to again change state, whereupon a forward "clear" pulse train 40 of $f + \Delta f$ and $f - \Delta f$ tones are transmitted to the far end for 600 msec. The voice transmit path of the calling end converter 14 is again open circuited for the duration of these pulses. The pulse train 40 is received, causing the E-wire circuit 26-2 of the converter 16 to change state. The called party hangs up, causing the M-wire circuit 24-2 to change state. A backward "clear" pulse train 42 is sent back to the calling end which is received, causing the E wire circuit 26-1 of dialing converter 16 to change state. Again during this pulse signalling, the respective voice transmit paths are opened.

When E-wire and M-wire circuits 24-1, 24-2 and 26-1, 26-2 again revert back to an open state, the two dialing converters 14 and 16 return to the idle condition as shown in FIG. 3E.

Figure 5:
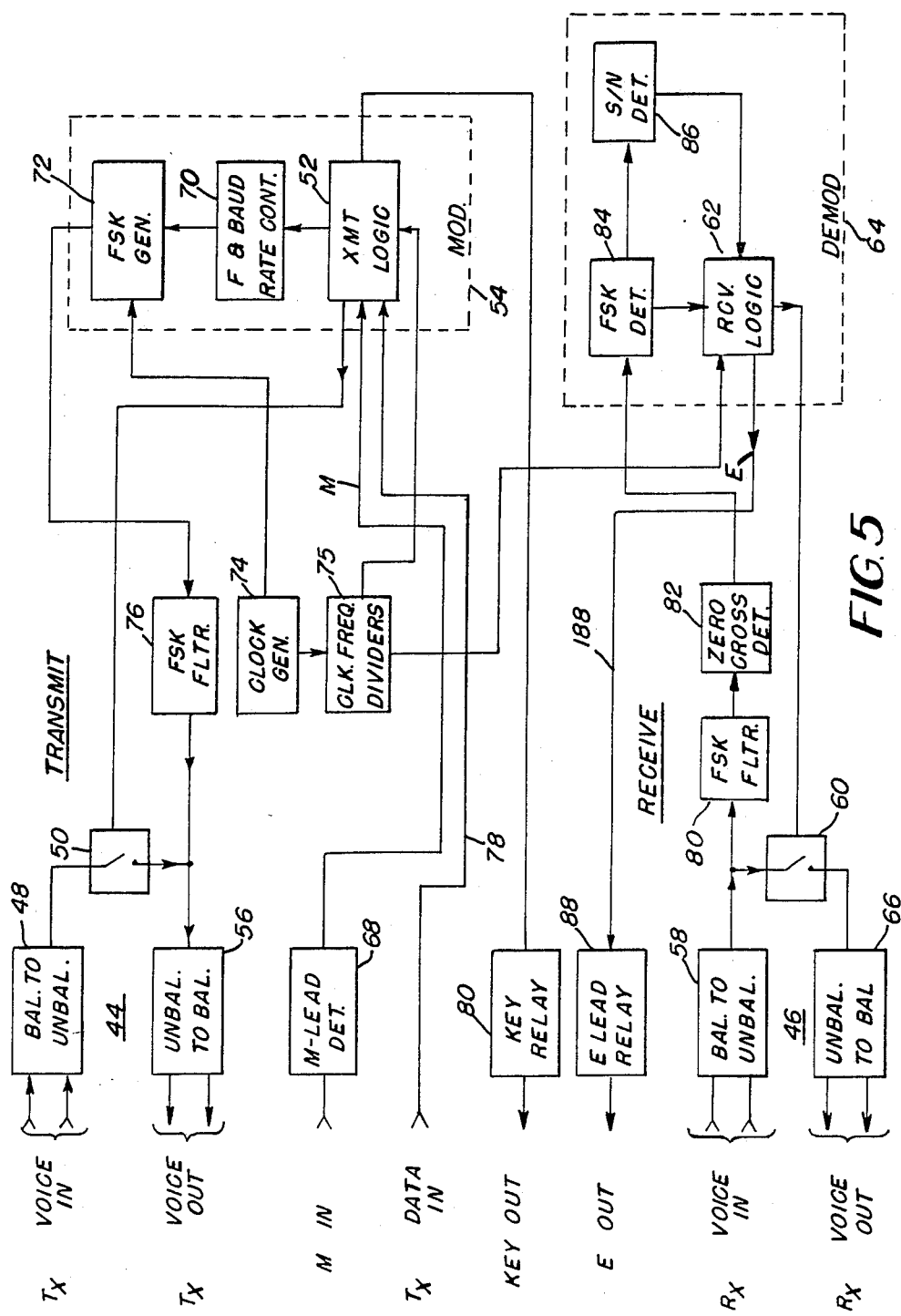
FIG. 5 is an electrical block diagram illustrative of the trunk dialing converter shown in FIG. 1.

Referring now to the invention, shown in FIG. 5 is an electrical block diagram which is illustrative of one of the trunk dialing converters 14 shown in FIG. 1, it being noted that apparatus 14 and 16 are both identical in construction. The trunk dialing converter 14 includes, among other things, a voice path circuit 44 for translating voice communication from the respective telephone system 20 to the radio link 18 and a separate voice path circuit 46 for receiving voice communication from the radio link 18 and coupling same back to the telephone system 20.

As shown, transmit ($T_x$) voice communication from the local telephone system 20, for example, is coupled to a balanced (two wire) to unbalanced (one wire) voice input circuit 48 which couples to one side of a transmit path isolation switch 50, which in turn is controlled by a digitally implemented transmit logic circuit 52 located in the modulator section 54 of the transmit portion of the dialing converter. The other side of the switch 50 is coupled back to an unbalanced to balanced output circuit 56 which provides a two wire output which is coupled to the high frequency radio link 18.

With respect to receiving ($R_x$) voice communication signal from the radio link 18, the voice path isolation circuit 46 includes a substantially identical balanced to unbalanced input circuit 58 which receives two wire voice communications from the high frequency radio link 18. The circuit 58 is coupled to a receive path isolation switch 60 which is controlled by a receive logic circuit 62 located in the demodulator portion 64 located in the receive portion of the apparatus. The voice path isolation switch 60 is coupled back to an unbalanced to balanced output circuit 66 which provides a two wire connection signal back to the local telephone system 20.

Thus two separate voice paths, one for transmission and one for reception, are included in each trunk dialing converter, with both paths having isolation switches which, as will be shown, are opened during respective FSK pulse transmission and reception.

FSK control signal transmission by the trunk dialing converter shown in FIG. 5 is provided for in the transmit portion of the apparatus by the inclusion of a conventional M-wire change detector circuit 68 which is responsive to any change in the M-lead voltage level received from the telephone system 20. The output of the M-wire detector 68 is coupled to a digitally implemented transmit logic circuit 52 which operates, among other things, to open the transmit voice path isolation switch 50 and to control a frequency and baud rate control circuit 70. FSK signals of 1615 Hz and 1785 Hz are generated digitally by an FSK generator 72 which is responsive to a clock input frequency from a clock generator 74 and control from the frequency and baud rate control circuit 70. The details of the latter circuits are not shown inasmuch as they comprise circuit designs well known to those skilled in the art. The FSK pulse output from the generator 72 is coupled to the voice output circuitry 56 through a digital band pass filter 76.

Digital input data is also capable of being transmitted from the trunk dialing converter as shown in FIG. 5 via a data input lead 78 which is coupled to and controls the FSK generator 72 through transmit logic circuitry 52. The transmit logic circuitry 52 is also coupled to a keying relay 80 which is adapted to be opened and closed and provide an alternately open and grounded connection to the radio link 18.

Figure 4:
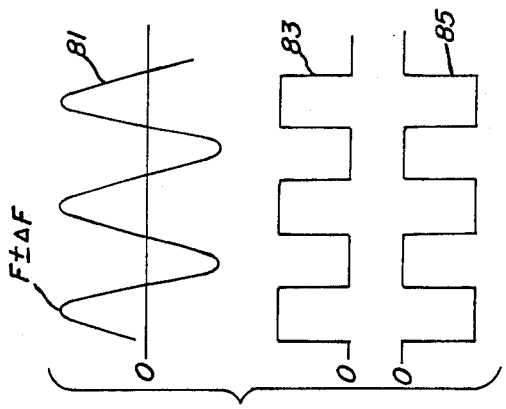
FIG. 4 is illustrative of a set of waveforms which are utilized by the FSK detector in the invention.
Figure 6A:
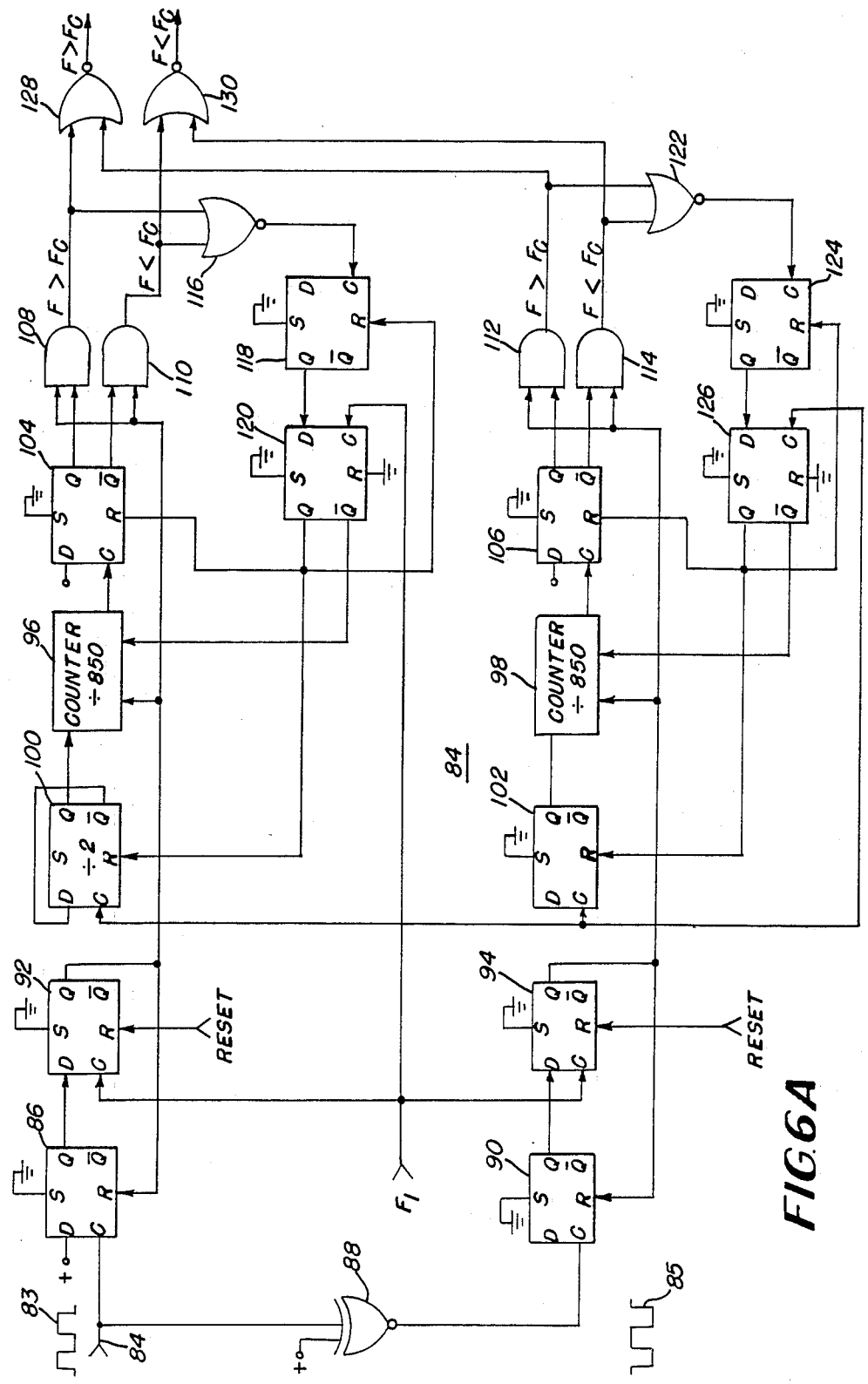
Figure 8:
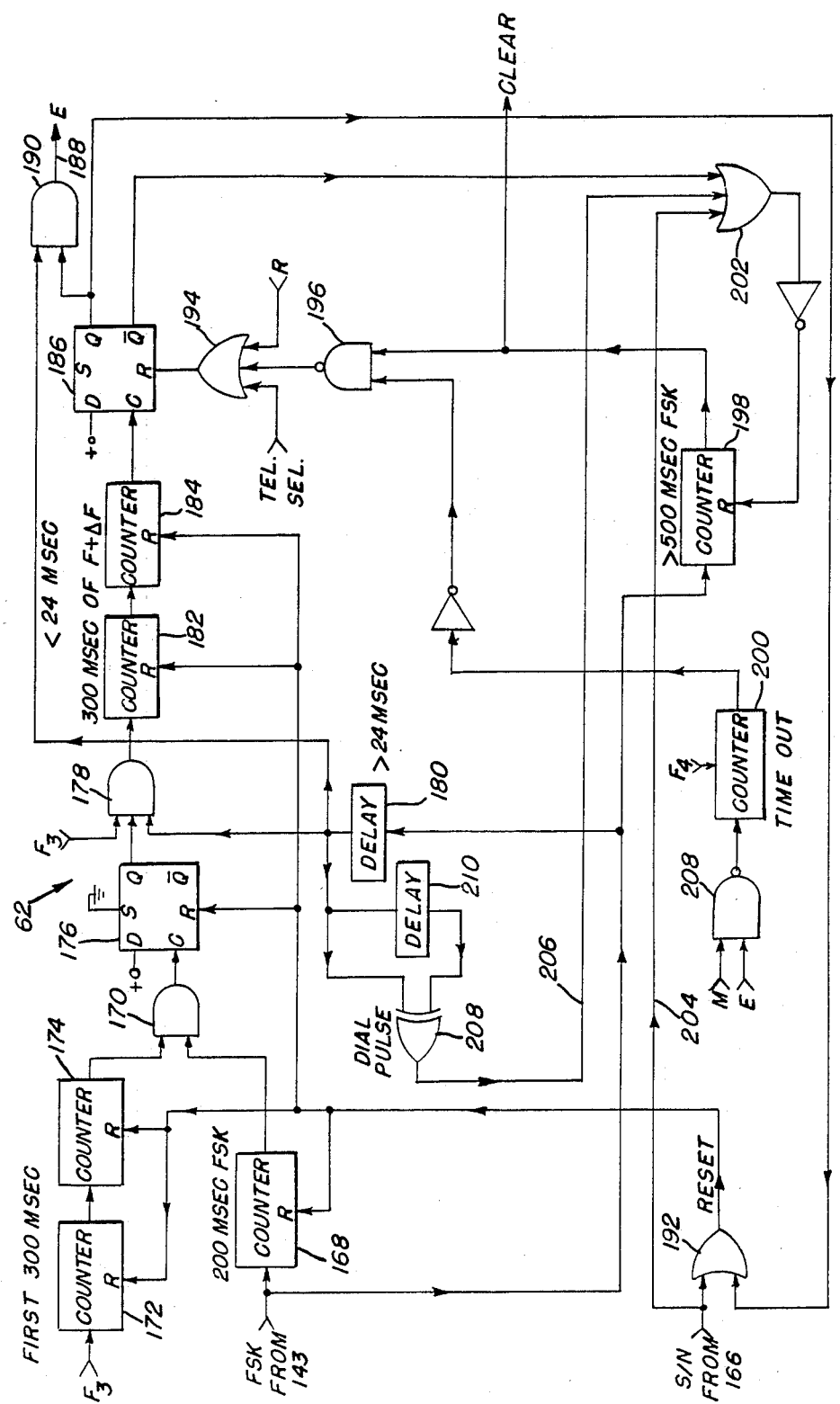
FIG. 8 is a simplified electrical schematic diagram of the receive logic circuitry included in the demodulator section shown in FIG. 5.

In the receive portion of the trunk dialing converter shown in FIG. 5, both voice and analog, i.e. sinusoidal 1785 Hz and 1615 Hz FSK signals are coupled to input circuit 58 from the radio link 18. Voice signals are fed to the output circuit 66 through the voice path isolation switch 60 while the analog FSK signals are fed through a FSK filter 80 to a zero crossing detector circuit 82 which transforms the sinusoidal high and low tone $f \pm \Delta f$ signal 81 into a square wave signal of the same respective frequency as shown by reference numeral 83 of FIG. 4. This square wave output is fed to an FSK detector 84, the details of which are shown in FIGS. 6A and 6B. The output of the FSK detector 84 is coupled to a signal to noise (S/N) detector or estimator circuit 86, the details of which are shown in FIG. 7. The FSK detector output is also coupled to the receive logic circuit 62, the details of which are shown in FIG. 8. As will be explained in detail subsequently, the receive logic circuit 62 operates to either open isolation switch 60 of the receive voice path 46 or to activate an E-lead relay 88 which operates to change the state of the E-lead wire to the local telephone system 20 when valid or acceptable FSK control signals are received.

Referring now to FIGS. 6A and 6B, the square wave output 83 (FIG. 4) from the zero crossing detector 82 comprises either a square wave pulse train of $f + \Delta f = 1785$ Hz or $f - \Delta f = 1615$ Hz centered about a center frequency $f_c = 1700$ Hz. The pulse train 83 is applied to input lead 84 where it is commonly applied to the clock (C) input of a flip-flop 86 to one input of an exclusive NOR circuit 88. The output of circuit 88 comprises an inversion 85 (FIG. 4) of the square wave 83 and is fed to the clock (C) input of flip-flop 90. The two clock inputs of the flip-flops 86 and 90, accordingly, comprise square waves corresponding to the alternate half cycles of the output from zero crossing detector 82. The flip-flops 86 and 90 are triggered by the leading edge of the respective square waves. Flip-Flops 86 and 90 have their Q outputs coupled to the D inputs of respective flip-flops 92 and 94 which have applied to their clock (C) inputs a clock frequency $f_1$ and comprising, for example, a 792 KHz clock signal from the clock frequency divider 75 (FIG. 5). A system reset signal (R) is applied to the R inputs of both flip-flops 92 and 94 to initially reset the flip-flops. The Q outputs thereof are applied back to the R inputs of flip-flops 86 and 90 and to respective counter circuits 96 and 98 which also have a count input applied thereto from flip-flops 100 and 102 which in turn are clocked by the clock frequency $f_1$. The combination of counters 96, 100 and 98, 102 form frequency dividers which divide $f_1$ by a fixed number and which are triggered in response to the reception of the leading edges of square waves 83 and 85. The output count of the dividers is used to clock respective flip-flops 104 and 106. With respect to the flip-flop 104, its Q output is connected to a first AND gate 108 while its $\overline{Q}$ output is connected to a second AND gate 110. Gates 108 and 110 have their other inputs connected to the Q output of flip-flop 92 so as to be enabled by the received leading edge of 83. In a like manner, the Q and $\overline{Q}$ outputs of flip-flop 106 are coupled to a pair of AND gates 112 and 114 with a second input thereto being coupled to the Q output of flip-flop 94 so as to be enabled by the leading edge of square wave 85.

The outputs of the AND gates 108 and 110 are first coupled to a NOR gate 116 which is used to clock the (C) input of a flip-flop 118 whose Q output is connected to the D input of a second flip-flop 120 which is clocked by the $f_1$ clock frequency signal. Likewise, the outputs of AND gates 112 and 114 are coupled to a NOR gate 122 which is coupled to the (C) input of flip-flop 124 which in turn is coupled to the D input of flip-flop 126 which is also clocked by the clock frequency $f_1$.

It is significant to note at this point that the outputs of AND gates 108 and 112 of the upper and lower digital signal channels are coupled to the same NOR gate 128 while the outputs of AND gates 110 and 114 are coupled to the same NOR gate 130.

Both the upper and lower channels operate in an identical fashion to provide a measure of the FSK frequency of the respective square wave inputs 83 and 85 applied thereto and whether the measure thereof is above or below the center frequency $f_c = 1700$ Hz i.e. at 1785 Hz or 1615 Hz. Considering the operation of the upper channel, for example, the $f_1 = 792$ KHz clock signal is divided by 1700 for each leading edge of square wave 83, causing the flip-flop 104 to be triggered at a 1700 Hz rate by the counter 96. The Q and $\overline{Q}$ outputs of flip-flops 104 also change state alternately at a 1700 Hz rate; however, the leading edge trigger provided from the Q output of flip-flop 92 being applied to the other inputs of AND gates 108 and 110 cause respective pulse outputs to be generated which are indicative of whether the FSK frequency is greater than and less than the center frequency $f_c$ of 1700 Hz. The bottom channel signals appearing at the AND gates 112 and 114 provide the same frequency information for the alternate half cycle of the input, thereby providing twice as much information regarding the frequency of the input.

Accordingly, the output of the NOR gate 128 provides an indication of whether the output of the zero crossing detector 82 is greater than the center frequency $f_c$ while the NOR gate 130 provides a signal output corresponding to whether or not the output of the zero crossing detector is less than $f_c$. The flip-flops 118, 120 and 124, 126 provide a synchronized reset for the counters, 96, 100 and 98, 102 for each output of the AND gates 108, 110 and 112, 114.

Referring now to FIG. 6B, the pulse signals $f > f_c$ and $f < f_c$ which respectively appear at the outputs of the NOR gates 128 and 130 are next applied to a pair of digital counters which divide and effectively integrate the respective number of pulses applied thereto by a predetermined division factor. The counters 130 and 132 are weighted i.e. have different division factors to account for the fact that a frequency $f>f_c$ has a greater number of zero crossings than the lower frequency $f<f_c$ so that equalized number of pulses appear at the respective outputs on leads 134 and 136 for an equal sampling period or increment. Thus, for example, during any one millisecond interval, the counters 130 and 132 would provide the same number of pulse outputs for an uneven number of inputs due to their respective pulse frequency.

The outputs of the counters 130 and 132 appearing on leads 134 and 136 are utilized to alternately trigger an FSK output flip-flop 138. This is provided by a pair of pulse amplifiers 140 and 142 being connected to the set(S) and reset(R) inputs of flip-flop 138. The counters 130 and 132 are reset each time an output pulse appears on leads 134 and 136 by means of an AND gate 144. Accordingly, the $\bar{Q}$ output state of flip-flop 138 will switch for each occurrence of an alternate high and low frequency output from the counters 130 and 132, thereby providing a demodulated digital square wave signal indicative of the FSK analog signals received from the radio link 18 (FIG. 1).

Referring now to FIG. 7, shown thereat is a schematic diagram of the signal-to-noise ratio detector or estimator 86 which is provided by the subject invention in order to inhibit operation of the receive logic circuitry 62 when a noisey signal is received, for example, from the high frequency radio link 18 and/or where invalid, i.e. well defined analog FSK signals are not received.

As shown, the two frequency signal outputs from the NOR gates 128 and 130 (FIG. 6A) are coupled to the set(S) and reset(R) inputs to a flip-flop 146 through a pair of exclusive NOR gates 148 and 150. They are relatively noisier digital signals than that of the output from the integrating counters 130 and 132 in that the logic levels at this point change more often. The circuitry of FIG. 7 additionally includes three pulse delay elements 152, 154 and 156. The input and output pulse of the first delay element 152 are coupled to an exclusive OR gate 158. The output of gate 158 is connected to the clock (C) input of a flip-flop 160. The input and output of the third delay element 156 is commonly connected to the reset (R) input of flip-flop 160 and the counter 162 through an exclusive OR circuit 164. The counter 162 has a clock input $f_2$ which comprises, for example, a 10 KHz clock signal from the clock generator frequency divider 75 shown in FIG. 5.

In operation, the counter 162 begins to count pulses of the frequency $f_2$ each time it is reset by the output of the exclusive OR circuit 164. The clock (C) input of flip-flop 160 is also reset by the exclusive OR gate 164. Thus the first pulse output from the flip-flop 146 upon reaching the output of delay element 156 resets both the flip-flop 160 and the counter 162. The second pulse output of the flip-flop 146 triggers the flip-flop 160 via the exclusive OR gate 158. This transfers the logic output level, i.e. "1" or "0" to the (D) input of flip-flop 160 which is transferred to the Q output. Accordingly, when a valid FSK signal is gated out of the flip-flop 146, the counter 162 always reaches a predetermined logic level e.g. a logic "1". Therefore a constant "1" logic level appears at the $\bar{Q}$ output of the flip-flop 160 and the S/N lead 166. If, however, a noisey condition exists, then more than normal pulses will be applied to the flip-flop 146 from the NOR gates 128 and 130, causing a shorter elapsed time to exist between output pulses from the Q output of the flip-flop 146. This prevents the counter 162 from reaching its predetermined final count and therefore its two possible "1" and "0" logic states change more often. Accordingly, the $\bar{Q}$ output will appear as a pulse or series of binary pulses, depending upon the duration of the noise rather than a fixed "1" logic level. This pulse output appearing on the S/N lead 166 will be utilized as a reset signal for the receive logic circuitry shown in FIG. 8.

Referring now to FIG. 8, the FSK detector output signal from circuit lead 143 is first applied as an input to a counter 168 whose output is coupled to an AND gate 170. The counter 168 acts in combination with two other counters 172 and 174, with counter 172 having a clock input frequency $f_3$ of, for example, 1 KHz applied thereto from the clock frequency divider 75 shown in FIG. 5. The output of counter 174 is coupled to the other input of AND gate 170. The purpose of the three counters 168, 172 and 174 is to determine the presence of the first 300 msec of FSK received. Counter 168 is used to count 15 clock cycles of the received FSK while the combination of counters 172 and 174 determine that a 300 millisecond count of FSK is really a count of 15 clock cycles and has arrived between 200 and 400 msec. The AND gate 170, therefore, receives two inputs, one of which indicates that 15 clock cycles of FSK have been counted and the other indicates that this conclusion was reached within a prescribed time interval of 200 to 400 msec.

If this condition exists, meaning that 300 msec of FSK is present, the output of AND gate 170 clocks a flip-flop 176 whose Q output is connected to one of three inputs to a second AND gate 178. One other input to the AND gate 178 comprises the 1 KHz clock frequency $f_3$, while the third input comprises an FSK signal input from a time delay element 180. Thus if FSK is present for a period of at least 24 msec following the first 300 milliseconds msec of reception, the AND gate 178 provides an output which enables a pair of counters 182 and 184.

The counters 182 and 184 determine if the 300 msec period following the initial 300 msec of FSK comprises a constant frequency or tone which is indicative of the reception of a valid "seize" pulse. Thus if the two conditions are met, at the end of 600 msec flip-flop 186 is clocked from counter 184, causing its Q output to change state. This change of state signal is coupled to an AND gate 190 along with the output from the delay element 180, and an E-wire change of state signal is provided on lead 188 which is used to operate the relay 88 of FIG. 5.

Enhanced operation of the trunk dialing converter is achieved by the presence of the signal-to-noise detector because the S/N pulse output appearing on circuit lead 166 during the presence of noise acts to constantly reset all of the counters 168, 170, 172, 182 and 184 as well as the flip-flop 176. Thus the E signal generation is inhibited during the presence of undesired noise and is only generated when acceptable FSK signals are received.

It should also be noted that the Q output of the flip-flop 186 is also coupled back to an OR gate 192 for applying a reset signal to the counters when a valid "seize" signal is received. The remainder of the receive logic circuitry shown in FIG. 8 is directed to means for resetting the flip-flop 186. As shown, the reset(R) input to the flip-flop 186 is coupled from an OR gate 194. One input comprises an externally applied reset signal which is applied, for example, during system turn-on or a manual reset being effected from a front panel, not shown. The second input comprises a reset signal externally applied when the telephone operational mode is deactivated. The third input comprises the output from a logic gate 196 whose two inputs comprise the respective output from the counters 198 and 200. The counter 198 is coupled to and is responsive to the applied FSK signal from the FSK detector output lead 143 (FIG. 6B). The counter 198 is used to generate a "clear" control signal 600 msec after its associated telephone set is hung up. In absence of such a condition, the counter 198 is continually reset by either the $\overline{Q}$ output of the flip-flop 186, the signal-to-noise detector output on lead 204 or during the presence of dialing pulses which appears on lead 206. The reset signal on signal lead 206 is provided by an exclusive OR circuit 208 coupled across the delay element 210 whose input comprises the FSK signal after it has been delayed by the delay element 180.

The counter 200 provides a "time-out" circuit feature which generates a reset signal for the flip-flop 186 in the event that a complete link is not established within 100 seconds as counted from a clock frequency $f_4$ which may be, for example, 50 Hz applied from the clock frequency divider 75 of FIG. 5. The counter 200 is initiated by the output of a NAND circuit 208 which has two inputs, an M-lead signal and an E-lead signal. And accordingly it is initiated only in the event that both an M-lead signal and an E-lead signal are present. Accordingly, this circuit simply times out and applies a reset signal through the gate 196 and the NOR gate 194 in the event, for example, that the E-lead is seized and nothing further takes place.

Thus what has been shown and described is an improved trunk dialing converter which includes a FSK demodulator having a digitally implemented FSK detector and signal-to-noise detector which operate to enhance the operation of the logic circuitry utilized to generate the E-wire relay control signal.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

I claim:

1. A trunk dialing converter for telephone apparatus including M and E wire control, comprising:
    a pair of voice communication circuits, one for transmitting voice signals and one for receiving voice signals, each said voice circuit including an input circuit and an output circuit;
    respective signal interrupters connected in said pair of voice communication circuit between said input and output circuit;
    an M-wire circuit and an E-wire circuit;
    a frequency shift keyed (FSK) modulator circuit coupled to the M-wire circuit and the respective signal interrupters therefor and being responsive to a change of signal level on said M-circuit, for generating and coupling an FSK output signal to said output circuit of the transmitting voice communication circuit and concurrently activating the respective signal interrupters to provide an open circuit between the input and output circuits of said transmitting voice communications circuit;
    an FSK demodulator circuit coupled to said input circuit of said voice communication circuit for receiving voice signals, the respective signal interrupters therefor, and the E-wire circuit and being responsive to signals received by said receiving voice communication circuit, for operating and coupling a change of level signal to said E-wire circuit and concurrently upon sensing FSK signals, activating the respective signal interrupters to provide an open circuit between the input and output circuits of said receiving voice communication circuit; and
    means for converting sinusoidal signals received by said input circuit of said receiving voice communication circuit to square wave signals;
    said FSK demodulator circuit additionally including a receive digital logic circuit and an FSK signal detector, said detector being responsive to said square wave signals from said converting means for generating a demodulated digital signal indicative of an FSK signal, said logic circuit being coupled to and responsive to said demodulated digital signal to generate and couple an E-wire control signal to said E-wire circuit for received FSK signals of predetermined frequency format and duration.

2. The trunk dialing converter as defined by claim 1 wherein said FSK signal detector generates an intermediate output signal having a frequency greater than said binary digital output signal, and wherein said demodulator circuit additionally includes a signal-to-noise detector circuit coupled to said intermediate output signal, said signal-to-noise detector circuit generating a pulse signal for received signals other than predetermined valid FSK signals to inhibit the generation of the E-wire change of level signal by said logic circuit.

3. The trunk dialing converter as defined by claim 1 wherein said converting means comprises a zero crossing detector.

4. The trunk dialing converter as defined by claim 3 and additionally including a clock frequency generator, and wherein said FSK detector includes:
    pulse counter means, responsive to clock frequency pulses of a predetermined frequency from said clock frequency generator and being triggered by signals corresponding to the leading edge of square wave signals from said converting means, for generating a square wave pulse output at the center frequency $f_c$ of the FSK signals received,
    first circuit means, coupled to said pulse output from said counter means and also to said signals corresponding to the leading edge signals, for generating a first and second square wave signal which respectively provide a measure of whether the FSK signal being received is greater than ($f > f_c$) or less than ($f < f_c$) said center frequency $f_c$; and
    second circuit means, including means for being alternately triggered by said first and second square wave signals, for generating a demodulated digital signal having a first binary value when the FSK signal received is greater than said center frequency and having a second binary value when the FSK signal received is less than said center frequency.

5. The trunk dialing converter as defined by claim 4 wherein said pulse counter means generates a square wave pulse of the center frequency $f_c$ of the first half cycle of FSK signals received and wherein said FSK detector additionally includes, signal inverter means for inverting said square wave signals from said converting means, another counter means, responsive to said clock frequency pulses of said predetermined frequency from said clock frequency generator and being triggered by signals corresponding to the leading edge of the inverted square wave signals from said signal inverter means, for generating a square wave output at the center frequency $f_c$ of the next half cycle of FSK signals received, another first circuit means, coupled to said pulse output from said another counter means and also to said signals corresponding to the leading edge of the inverted square wave signals, for generating third and fourth square wave signals which respectively provide a second measure of whether the FSK signal being received is greater than ($f > f_c$) or less than ($f < f_c$), said center frequency $f_c$, a first logic gate for combining said first and third square wave signals and providing a measure of FSK signals greater than the center frequency, and a second logic gate for combining said second and fourth square wave signals and providing a measure of FSK signals which are less than said center frequency, said first and second logic gates respectively providing thereby composite outputs of FSK signals of $f > f_c$ and $f < f_c$, and wherein said composite outputs are utilized as trigger signals for triggering said second circuit means and providing thereby a demodulated digital signal for each half cycle of FSK signals being received.

6. The trunk dialing converter as defined by claim 5 and additionally including means coupled between said first and second logic gate and said second circuit means for integrating the composite outputs to provide equal numbered input pulses to said second circuit means during any equal time interval of $f > f_c$ and $f < f_c$ FSK signals received.

7. The trunk dialing converter as defined by claim 6 wherein said integrating means comprises a pair of pulse frequency dividers having relatively different division factors respectively coupled between said first and second logic gate and said second circuit means.

8. The trunk dialing converter as defined by claim 7 wherein each of said pulse frequency dividers comprises a digital counter.

9. The trunk dialing converter as defined by claim 8 wherein said means of said second circuit means comprises a binary flip-flop circuit.

10. The trunk dialing converter as defined by claim 5 and wherein said FSK detector additionally includes leading edge circuit means coupled between said means for converting sinusoidal signals received and said pulse counter means for generating a leading edge signal.

11. The trunk dialing converter as defined by claim 10 wherein said leading edge circuit means for generating said leading edge signal includes a pair of flip-flop circuits, the first of said pair of flip-flop circuits being clocked by said square wave signals from said converting means and the second of said pair of flip-flop circuits being clocked by said clock frequency pulses of a predetermined frequency from said clock frequency generator, said first flip-flop having an output coupled to one input of said second flip-flop and causing the input applied thereto to be transferred to an output of said second flip-flop in synchronism with said clock frequency pulses.

12. The trunk dialing converter as defined by claim 5 wherein said demodulator circuit additionally includes a signal-to-noise detector circuit coupled to said composite outputs of said first and second logic gates and generating a control signal coupled to said receive logic circuit for inhibiting generation of the E-wire change of level signal by said receive logic circuit for received FSK signals having undesired predetermined noise levels.

13. The trunk dialing converter as defined by claim 12 wherein said signal-to-noise detector circuit includes a flip-flop circuit including a pair of inputs and having said composite outputs of said first and second logic gates respectively coupled thereto, said flip-flop being triggered thereby to provide a pulse output at least one output thereof;

and circuit means for measuring the elapsed time between pulses at said at least one output and including logic means for generating a steady state binary control signal in response to valid FSK signals and an alternating state binary control signal for invalid FSK signals including noise signals.

14. The trunk dialing converter as defined by claim 13 wherein said last recited circuit means includes pulse signal delay means coupled to said at least one output of said flip-flop circuit for providing a pulse delay at the output of said flip-flop circuit of at least one pulse, a counter circuit coupled to a predetermined clock frequency from said clock generator and being reset by a pulse at the output of said pulse signal delay means, another flip-flop circuit also being reset by said pulse at said output of said pulse signal delay means and triggered by the next pulse applied to said pulse signal delay means, said counter circuit having an output coupled to a binary logic input of said another flip-flop which couples the binary logic state thereat to a binary logic output thereof upon being triggered, said counter circuit reaching a predetermined count and providing the same binary logic state at the output thereof for valid FSK signals having a predetermined time interval between successive signals to cause the output of said another flip-flop to remain at a constant binary value, but for invalid FSK signals and noise signals wherein the interval between successive signals is less than said predetermined time interval, said counter fails to reach said predetermined count thereby causing the output of said another flip-flop to change binary state and generate at least one pulse for inhibiting said receive logic circuit means.

15. The trunk dialing converter as defined by claim 14 wherein detected FSK signals are coupled to said logic circuit means, said logic circuit means further including counter means coupled to said clock generating means for determining the time duration of the detected FSK signal, and wherein said at least one pulse at the output of said another flip-flop acts to reset said counter means and prevent the generation of said E-wire change of level signal.

* * * * *